(No Model.)

D. W. FREEMAN.
ADJUSTABLE CLUTCH OR COUPLING DEVICE.

No. 470,648. Patented Mar. 8, 1892.

Witnesses
R. G. Morrow
G. G. Ames

David W. Freeman
Inventor
by T. Geisler
his Attorney

UNITED STATES PATENT OFFICE.

DAVID W. FREEMAN, OF FISHHAWK, OREGON.

ADJUSTABLE CLUTCH OR COUPLING DEVICE.

SPECIFICATION forming part of Letters Patent No. 470,648, dated March 8, 1892.

Application filed June 22, 1891. Serial No. 397,163. (No model.)

*To all whom it may concern:*

Be it known that I, DAVID W. FREEMAN, a citizen of the United States, residing at Fishhawk, in Columbia county, State of Oregon, have invented a new and useful Adjustable Clutch or Coupling Device in Shafting, of which the following is a specification, reference being had to the accompanying drawings, forming a part hereof.

The object of my invention is to provide means for coupling and releasing again at will a loose band pulley or gear on a shaft, such coupling mechanism to be contained and adjusted in a slot in the shaft, so that the same may be operated to engage and fix one of a series of pulleys or gears on such shaft during its revolutions, or vice versa, causing the shaft to be engaged by one of a series of said pulleys or gears running at different speeds for the purpose of varying the transmitted speed.

Figure 1:
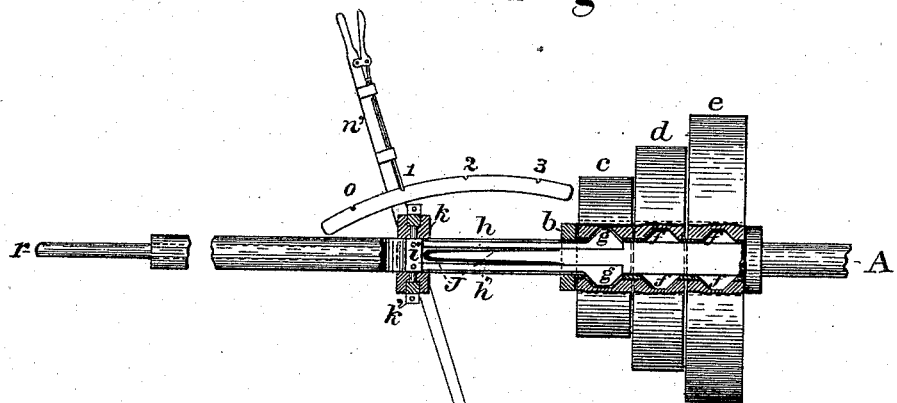
Figure 2:
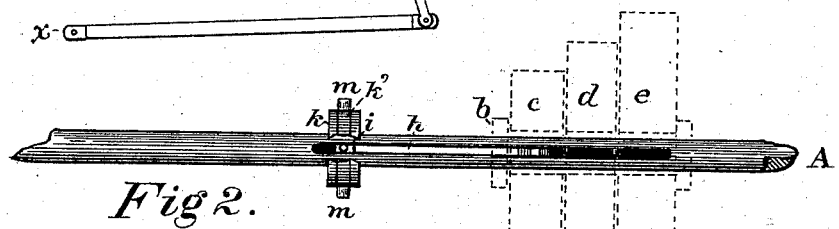
Figure 3:
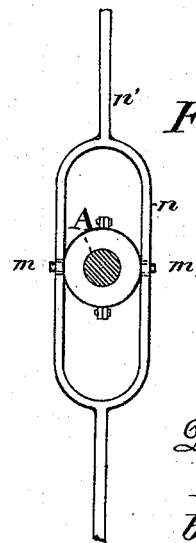

In the said drawings, Figure 1 is a side elevation with parts broken away, so as to show the slot in the shaft and adjustable clutch or coupling device located therein. Fig. 2 is a top view of the same mechanism, the dotted lines representing corresponding band-wheels, as seen in Fig. 1; and Fig. 3 is a partial end view.

Like letters and figures refer to like parts.

In the figures above described, $a$ represents a shaft provided with a sleeve $b$, on which a series of loose band wheels or gears $c\ d\ e$ are mounted, said sleeve having a flange at one end and being provided with a collar fixed thereon at the other end, so as to retain said loose wheels or gears in place. The sleeve is preferably constructed of some anti-frictional metal, so as to permit the free revolution of such pulleys or gears on the same. Said shaft is slotted, so as to contain the adjustable coupling device and the sleeve $b$ is also slotted to allow the keys $g$ of the coupling mechanism to project through the same when brought into engagement with the pulley or gear to be fixed. The slot in the sleeve is, however, not continuous as that of the shaft, but consists of series of slots or cuts corresponding with the indentations or recesses provided in the hubs of the respective pulleys or gears mounted on said sleeve, with which the keys of the coupling mechanism engage. The object in not having the slot in the sleeve continuous is to prevent the keys $g$ from coming in contact with the edges of the hubs of the pulleys or gears in being withdrawn from the eye of one of the same and inserted in the eye of another. The pulleys or gears with which my clutch or coupling device is to coact are mounted independently, being designed to run at different speeds, respectively, and each of the same should vary in size from the other progressively, according as it may be desired to vary the speed. Parallel to these loose pulleys or gears I arrange on a counter-shaft a series of fixed pulleys or gears proportioned relatively to the former in the inverse ratio, so that the larger pulley or gear will engage with the smaller in their order, and thus by shifting the coupling mechanism from one pulley or gear to another the speed of the transmitted motion may be increased or decreased. To permit this it is necessary of course that each of the series of pulleys or gears operate the corresponding pulley or gear by belting or gearing independently.

The coupling mechanism consists of arms $h\ h'$, each provided with a dog-like key $g$, and which arms are attached by means of a pivotal joint to a vertical bar $i$, so that the extremities of said arms may be brought together, and such arms being held apart by means of a spring $j$. The loose pulleys or gears $c\ d\ e$ have each indentations or recesses in their hubs opening into the eyes thereof, the ends of which (as well as the ends of said keys $g$) are inclined toward each other at opposite angles to easily receive said keys when projected therein. Said vertical bar $i$ is fixed by suitable means to a loose collar $k$, adjusting on the shaft, and said collar $k$ is further provided with a secondary collar $k'$, fitting in a groove extending around the periphery of such collar $k$, which said secondary collar is provided with lug-pins $m\ m$ for securing the same in the loop $n$ of the quadrant-lever $n'$. The base of such quadrant-lever is pivotally connected with a secondary lever extending nearly parallel to the shaft, one end $x$ of which is pivotally fixed to some suitable stationary device, the object of such secondary lever being to compensate for the shortening of the working line when the quadrant-lever $n'$ is set at an angle.

The operation of my device is easily understood. As appears from the drawings, by means of the quadrant and lever $n'$ the keys $g$ may be shifted or adjusted to engage with either of the band-wheels $c\,d\,e$—that is to say, by setting the lever in the notch 1 the keys will project into and engage with the recesses in the hub of the wheel $c$, in which position my clutching device is shown in Fig. 1, and so fix or key such wheel on the shaft. By shifting the lever to the notch 2 the keys $g$ are withdrawn from the wheel $c$ and caused to engage the wheel $d$, and by shifting the lever to the notch 3 the keys are caused to engage the wheel $e$, and if it is desired to release the shaft from all of the wheels $c\,d\,e$ the keys $g$ may be withdrawn, so as to clear the recesses of all the wheels by setting the lever $n'$ in the notch $o$ on the quadrant. It may be found preferable when using my coupling device in connection with certain machinery that the vertical bar $i$ of the clutching device be attached to a rod $r$, extending through a longitudinal boring provided for that purpose in the shaft and extending to the slot in the latter containing the coupling mechanism, and in that case the mechanism for shifting and setting such coupling mechanism would be attached to the outer end of such rod $r$.

My coupling device may be used in combination with a driving or driven shaft.

Having thus fully described my invention, now what I claim, and desire to secure by Letters Patent, is—

1. In combination, an adjustable clutch or coupling mechanism in shafting, consisting substantially of adjustable keys, as $g$, on arms $h\,h'$, which arms are pivotally jointed at one end, a suitable spring for keeping said arms expanded, a slotted shaft in which said keying mechanism is contained, a suitable sleeve mounted on said shaft and adapted to the purposes specified, a loose pulley or gear or series of the same mounted on said shaft and adapted to receive and be fixed by said adjustable keys, and means for shifting and adjusting said keying mechanism to bring the same into engagement with the pulley or gear to be fixed, substantially as described.

2. In a coupling device, the combination of a slotted shaft with a keying mechanism adjustable therein, consisting substantially of arms, as $h\,h'$, having key-like projections adapted to the purposes specified, and a suitable contrivance to which said arms are attached enabling the adjustment thereof, means for bringing said key-like projections into engagement with the pulley or gear to be fixed, as described, and means for adjusting said keying mechanism, for the purposes set forth.

DAVID W. FREEMAN.

Witnesses:
GEO. H. DURHAM,
T. J. GEISLER.